United States Patent

[11] 3,611,279

[72] Inventor William A. Hensley, Jr.
Bartlesville, Okla.
[21] Appl. No. 865,599
[22] Filed Oct. 13, 1969
[45] Patented Oct. 5, 1971
[73] Assignee Phillips Petroleum Company

[54] NOISE ELIMINATION FROM SEISMIC SIGNALS
4 Claims, 4 Drawing Figs.

[52] U.S. Cl. .................................................... 340/15.5,
323/75
[51] Int. Cl. ..................................................... G01v 1/00
[50] Field of Search .......................................... 340/15.5
MRC; 73/69, 70; 323/75Q

[56] References Cited
UNITED STATES PATENTS
| | | | |
|---|---|---|---|
| 2,064,385 | 12/1936 | Salvatori ...................... | 181/0.5 |
| 2,266,041 | 12/1941 | Hoover, Jr. ................... | 340/15.5 X |
| 2,365,218 | 12/1944 | Rogers ........................ | 73/70 |

Primary Examiner—Rodney D. Bennett, Jr.
Assistant Examiner—H. A. Birmiel
Attorney—Young and Quigg

ABSTRACT: Seismometers at a given location are connected in a bridge network so that two output signals are obtained. The first signal represents the sum of the desired measured signals plus noise. The second signal represents noise. Means are provided for subtracting the second signal from the first.

INVENTOR.
W. A. HENSLEY, JR

BY
Young & Quigg

ATTORNEYS

NOISE ELIMINATION FROM SEISMIC SIGNALS

It is common practice in the petroleum industry to obtain information concerning subterranean formations by seismic procedures. Vibrations are imparted to the earth at a first point, and vibrations reflected from subterranean beds are received at one or more second points spaced from the first point. From the resulting records, it is possible to obtain information concerning the slopes of reflecting beds, and thus obtain information concerning possible oil reservoirs. Various procedures are well known in the art for collecting and interpreting seismic records of this type.

A major problem encountered in these operations is in the recognition of reflected vibrations in the presence of extraneous vibrations which are commonly referred to as "noise." These noise vibrations can come from a number of sources, such as multiple reflections from shallow beds, surface waves, and wind vibrations. A number of procedures have been devised to reduce the effect of noise in seismic records. One of the most common methods is to sum signals from a plurality of seismometers so as to enhance reflections while the random noise signals tend to cancel one another. While these procedures are effective in improving the quality of seismic records obtained in many areas, it is necessary to employ a relatively large number of seismometers in order to obtain the desired signal enhancement. This can increase the cost of field procedures substantially, particularly when the surveys are being made in areas where transportation is difficult. In accordance with the present invention, an improved system is provided for reducing noise vibrations with a minimum number of seismometers. This is accomplished by positioning individual seismometers adjacent one another and connecting the seismometers in a bridge circuit in such a manner that the desired reflections are summed and the noise vibrations are cancelled. Two separate output signals are obtained from the bridge network. The first signal represents the sum of the reflections and the noise vibrations. The second signal represents only the noise vibrations. The second signal is then subtracted from the first so as to obtain a final signal which represents only the desired reflections. In the drawing:

Figure 4:
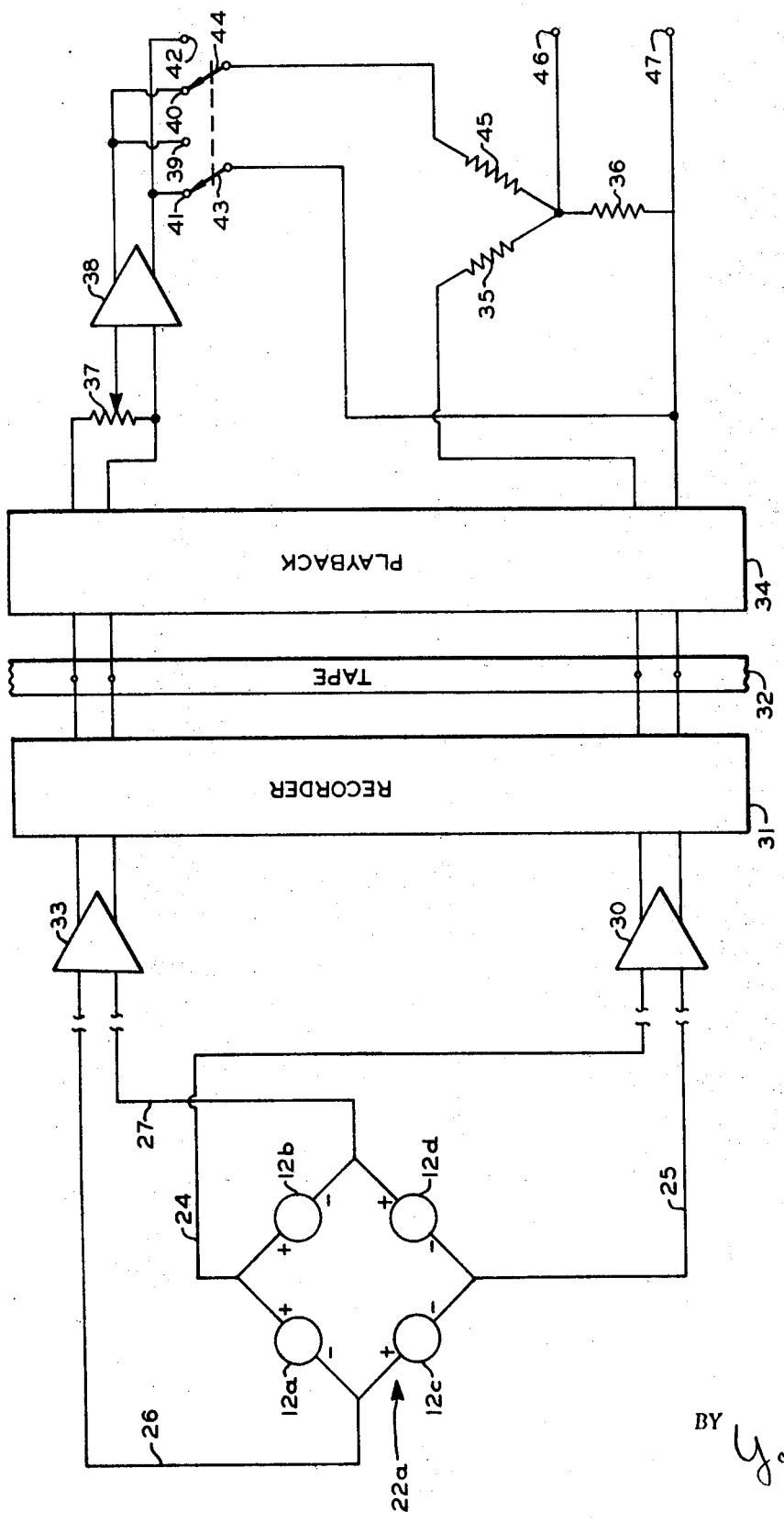

FIG. 4 is a schematic illustration of a portion of the signal recording and reproducing apparatus employed to carry out the method of this invention. Referring now to the drawing in detail and to FIG. 1 in particular, vibrations are imparted to the earth at a first location 10. This can be accomplished by detonating an explosive charge in a shot hole or by various mechanical vibrating means which are well known in the art. Vibrations emitted from location 10 travel downwardly through the earth and are reflected back from various subterranean reflecting beds, such as illustrated at 11. A plurality of seismometer stations 12 to 19 are disposed at the surface of the earth in spaced relationship with one another and with location 10. In accordance with this invention, each of these stations includes a plurality of individual seismometers, as will be described in detail hereinafter. The vibrations received at the seismometer stations are converted into corresponding electrical signals which are applied to recording apparatus 20.

Figure 2:
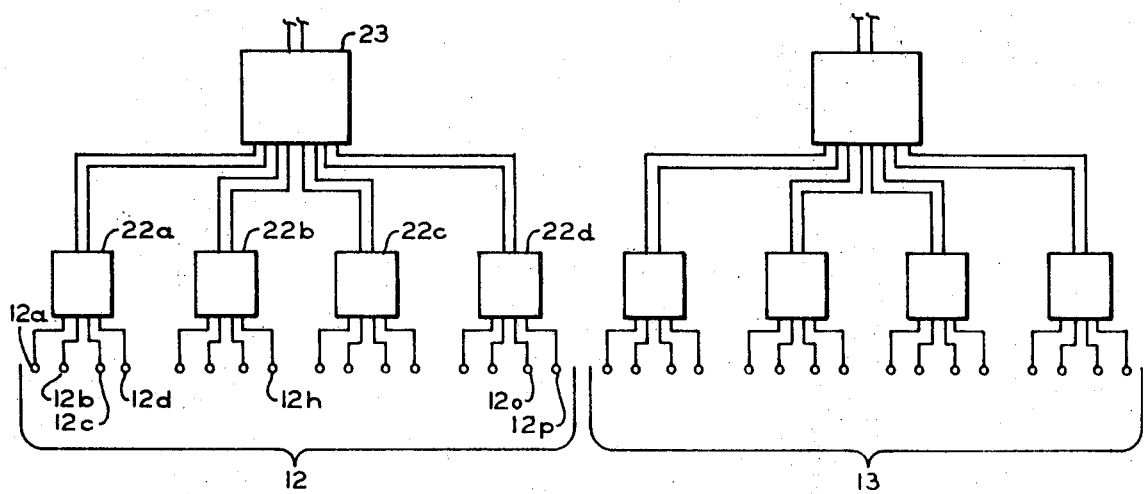
FIG. 2 illustrates the manner in which signals from seismometers at given locations are combined in accordance with this invention.

In one specific application of this invention, the signals received at the seismometer stations are combined with one another so that reflections from common subterranean reflecting beds are summed. This common reflection point type of operation is described in U.S. Pat. Nos. 2,732,906 and 3,040,833, for example. In such a system, each of the seismometer stations can represent a plurality of individual seismometers spaced from one another. As illustrated in FIG. 2, seismometer station 12 can contain sixteen individual seismometers 12a to 12p which are positioned along a line in equal spaced relationship. In accordance with this invention, the 16 seismometers are connected, in groups of four, to signal-combining circuits. For example, seismometers 12a, 12b, 12c and 12d are connected to a signal-combining circuit 22a. This circuit provides two output signals which are applied to a circuit 23 which combines these signals with corresponding signals from circuits 22b, 22c and 22d. The individual seismometers at the other stations are combined in a similar fashion. The number of groups of seismometers employed can be varied. In general, the signal-to-noise ratio in the final signal is increased when a larger number of seismometers is employed.

Figure 3:
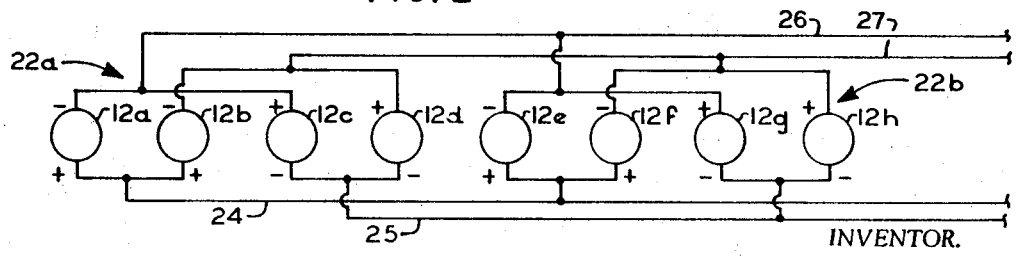
FIG. 3 illustrates in greater detail a portion of the signal combining circuit of FIG. 2.

Circuits 22a and 22b are illustrated in detail in FIG. 3. Corresponding first output terminals of seismometers 12a and 12b are connected to one another and to a lead 24. Similarly, corresponding second output terminals of seismometers 12c and 12d are connected to one another and to a lead 25. For convenience of discussion, the first terminals shall be referred to hereafter as the "positive" terminals, and the second terminals shall be referred to as the "negative" terminals. Actually, this designation merely refers to corresponding terminals of the individual seismometers. The negative output terminal of seismometer 12a is connected to the positive output terminal of seismometer 12c and to a lead 26. The negative output terminal of seismometer 12b is connected to the positive output terminal of seismometer 12d and to a lead 27. It is thus apparent that the four seismometers are connected in a bridge network such that the output signal appearing between leads 24 and 25 represents the sum of the output signals of a first pair of seismometers (12a and 12c) connected in series with one another and in parallel with a second pair of seismometers (12b and 12d). The output signal appearing between leads 26 and 27 is representative of difference between the output signals of the seismometers paired as 12a, 12b and 12c, 12d. The signal between leads 24 and 25 can thus be considered to represent the sum of the desired reflections and noise, whereas the signal between leads 26 and 27 can be considered to represent noise because the desired reflections are effectively subtracted from one another. If the noise vibrations are entirely random, these vibrations tend to cancel from both outputs. However, if they are not entirely random, which is often the situation, there will be a corresponding noise component in both outputs. It is this component that is subtracted in accordance with this invention. The groups of four seismometers in circuits 22b, 22c and 22d are connected in a similar manner.

Figure 1:
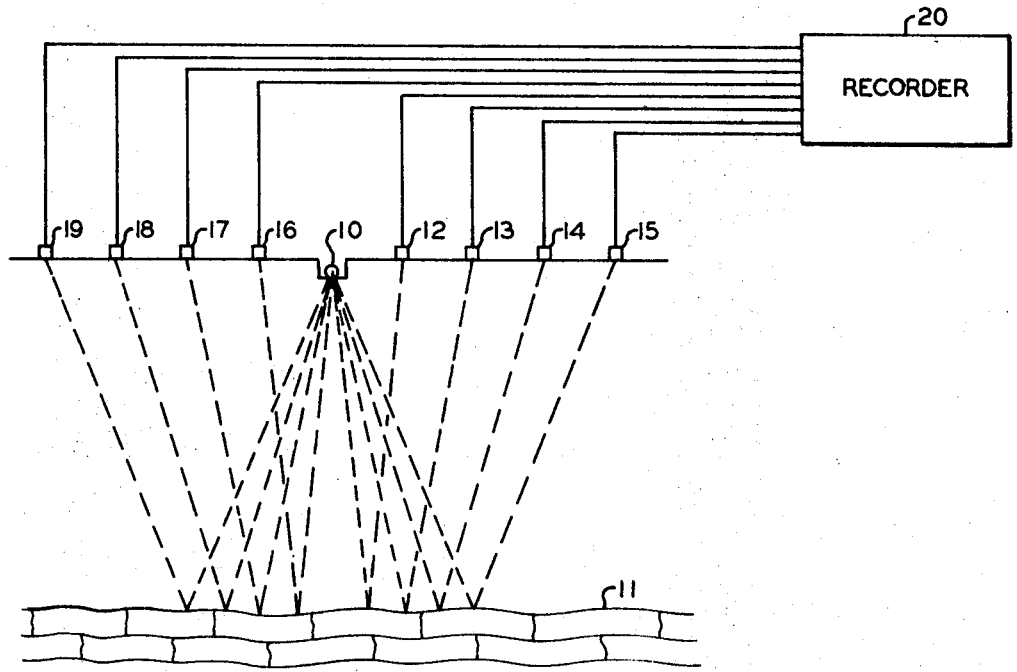
FIG. 1 is a schematic representation of a typical seismic exploration system in which the present invention is applicable.

As illustrated in FIG. 4, the output signal between leads 24 and 25 is applied to the input of a first amplifier 30, the output of which is applied to the first channel of a multichannel recorder 31. Recorder 31 can be any convenient type of apparatus normally employed in the seismic art to obtain records in the field. In recent years, it has become common practice to utilize magnetic tape recorders for this purpose. Recorder 31 can include conventional frequency modulation equipment or it can provide a corresponding digital output signal. In any event, the signals are stored on a tape 32 associated with the recorder. Similarly, the signal between leads 26 and 27 is amplified by an amplifier 33 and applied to a second channel of recorder 31. Each of the seismometer stations of FIG. 1 is provided with signal-combining apparatus of the type illustrated so that 16 individual signals are applied to recorder 31 when eight seismometer stations are employed, as illustrated in FIG. 1.

The records made in the field can subsequently be transported to a processing center for further manipulation. Tape 32 is then connected to a playback circuit 34 which provides output electrical signals representative of the signals recorded on tape 32. The signal originally recorded from amplifier 30 is applied across series-connected resistors 35 and 36. The signal recorded from the output of amplifier 33 is reproduced and applied across the end terminals of a gain control potentiometer 37. The contactor and one end terminal of potentiometer 37 are connected to the respective input terminals of a buffer amplifier 38. The first output terminal of amplifier 38 is connected to terminals 39 and 40, and the second output terminal of amplifier 38 is connected to terminals 41 and 42. A first switch 43 is adapted to engage terminals 39 and 41 selectively, and a second switch 44 is adapted to engage terminals 42 and 40 selectively. These two switches can be mechanically connected to one another so as to be operated in unison. Switch 43 is connected to one end terminal of resistor 36. A resistor 45 is connected between switch 44 and the junction between resistors 35 and 36. Output terminals 46 and 47 are connected to the respective end terminals of resistor 36. These terminals can be connected to a recorder or to a meter such as an oscilloscope.

Resistors 35, 36 and 45 provide a summing network so that the output signal from amplifier 33 can effectively be subtracted from the output signal from amplifier 30. The reversing switches 43, 44 are provided so that the polarity of the reproduced signals can readily be determined to accomplish the subtraction. Accordingly, the final output signal between terminals 46 and 47 effectively represents the desired seismic reflections having noise vibrations subtracted therefrom. This signal can subsequently be processed in any conventional manner.

While it is usually convenient to employ a field recorder and to transport the resulting records to a processing center, all of the apparatus of FIG. 4 can be positioned in the field. As an alternative, the output signals from individual seismometers can be recorded in the field and all of the processing can be done at a processing center. If all of the equipment is located in the field, the recorder is not needed. The signals from the seismometer bridges can be subtracted directly.

While the invention has been described in conjunction with presently preferred embodiments, it should be evident that it is not limited thereto.

What is claimed is:

1. In a seismic exploration system in which vibrations are imparted to the earth at a first region and vibrations are received at a second region which is adjacent the surface of the earth and which is spaced from the first region, the improvement comprising:
   four seismometers positioned at the second region to receive vibrations, each of said seismometers being adapted to establish an output signal which is representative of vibrations received by the seismometer, such output signal being established between first and second output terminals of the seismometer; and
   circuit means connecting said four seismometers in a bridge network, the corresponding first terminals of the first and second seismometers being connected to one another and to a first bridge terminal, the corresponding second terminals of the third and fourth seismometers being connected to one another and to a second bridge terminal, the second terminal of said first seismometer being connected to the first terminal of said third seismometer and to a third bridge terminal, and the second terminal of the second seismometer being connected to the first terminal of the fourth seismometer and to a fourth bridge terminal, whereby a first output signal is established between said first and second bridge terminals and a second output signal is established between said third and fourth bridge terminals.

2. The system of claim 1, further comprising a signal-subtracting means having first and second inputs, means connecting said first and second bridge terminals to said first input so that said first output signal is applied to said subtracting means, and means connecting said third and fourth bridge terminals to said second input so that said second output signal is applied to said subtracting means, said subtracting means establishing an output signal representative of the difference between said first signal and said second signal.

3. The system of claim 2 wherein said means connecting said bridge terminals to said subtracting means includes a recording means, means to apply said first and second output signals to said recording means as individual signals, and signal-reproducing means connected between said recording means and said subtracting means to apply the recorded signals individually to said subtracting means.

4. The system of claim 1, further comprising:
   a group of four second seismometers positioned at said second region adjacent the first mentioned seismometers to receive vibrations, each of said second seismometers being adapted to establish an output signal which is representative of vibrations received by the second seismometer, such output signal being established between first and second output terminals of the second seismometer;
   circuit means connecting the second seismometers in a second bridge network, the corresponding first terminals of the first and second of the second seismometers being connected to one another and to a fifth bridge terminal, the corresponding second terminals of the third and fourth of the second seismometers being connected to one another and to a sixth bridge terminal, the second terminal of the first of the second seismometers being connected to the first terminal of the third of the second seismometers and to a seventh bridge terminal, and the second terminal of the second of the second seismometers being connected to the first terminal of the fourth of the second seismometers and to an eighth bridge terminal; and
   circuit means connecting said first bridge terminal to said fifth bridge terminal, said second bridge terminal to said sixth bridge terminal, said third bridge terminal to said seventh bridge terminal, and said fourth bridge terminal to said eighth bridge terminal.